Feb. 28, 1933.       M. DEN OUTER       1,899,232
SHORTHAND TYPEWRITING OR STENOGRAPHIC MACHINE
Filed May 25, 1931
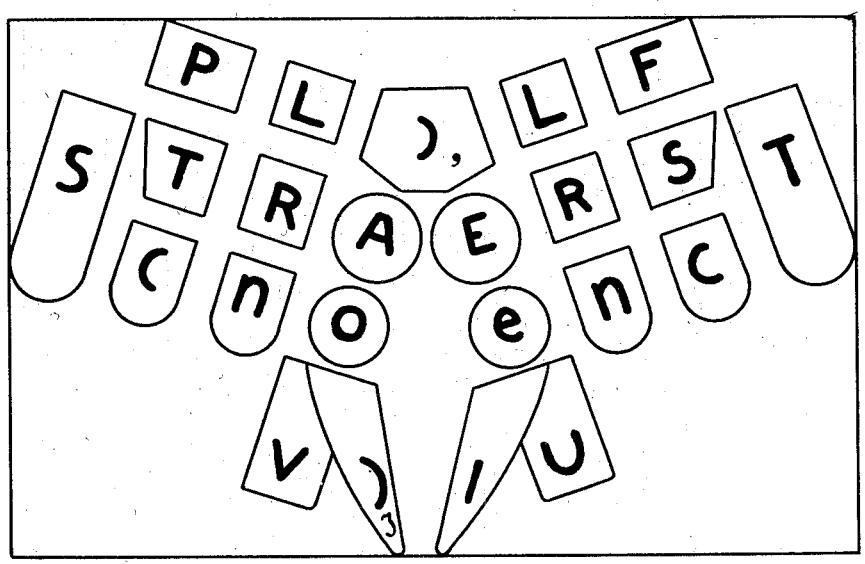
Inventor
M. Den Outer
By Marks & Clerk
Att'ys Patented Feb. 28, 1933

1,899,232

UNITED STATES PATENT OFFICE

MARIUS DEN OUTER, OF THE HAGUE, NETHERLANDS

SHORTHAND TYPEWRITING OR STENOGRAPHIC MACHINE

Application filed May 25, 1931, Serial No. 539,985, and in the Netherlands May 31, 1930.

For many years now attempts have been made to make machines for stenography for the purpose of replacing hand-written stenography by typewritten stenography and thus to increase both the speed in taking down shorthand and the distinctness of the resulting script. The first attempts in this direction led to a machine wherein the spoken word was represented by certain signs. Later the ordinary Latin letters were employed therefor. As the keyboard of the machine must be as restricted as possible, due to the shape of the hand, there were principally three methods. In the first method, a keyboard with about twenty keys was used, each key corresponding to three or four Latin letters which, with the simultaneous operation of one or more auxiliary keys, were imprinted on the paper. In the second method, using about the same number of keys as in the first method, different Latin letters were represented by a combination of two or more letters which were provided on the machine and which practically never occur in succession in speaking. Thus, for example, D was represented by TK, B by PW, G by TKPW, N by TPH. According to the third method, likewise requiring about twenty keys, different Latin letters were simply made equivalent to letters of the same sound already provided on the keyboard, for example, P=B, T=D, L=R, N=N, etc.

All these methods possess the disadvantage of being comparatively complicated. The invention now starts out with the idea of reproducing by the machine the sounds of the spoken word as phonetically as possible. Each key is regarded as the reproducer of one or more sounds, irrespective as to whether this reproduction is effected by Latin or other letters or by numerals, points, perforations or in any other way.

The subdivision of the keyboard according to the invention is based on the following considerations.

In accordance with the general formation of a syllable, the keyboard comprises in known manner, on the left hand side, keys for initial consonants, in the middle, vowels, and on the right hand side, final consonants. In Dutch, German, English and French, the consonants, according to phonetics, may be subdivided into:

A. Three pairs of so-called explosive sounds P—B, T—D, K—G.

B. Five so-called liquid consonants; M, N, NG, L, R.

C. Five pairs of so-called fricatives: F—V, TH—DH, S—Z, SH—ZH, CH—Y; and further W and H.

This subdivision is made the starting point of what follows.

According to the invention, the keys for the phonetic symbols are so subdivided on the keyboard that the keys for the vowels, situated in the middle, are adjoined on the right and left hand sides by a group of three keys arranged below one another for three of the so-called liquid consonants, preferably for the consonants L, R and N, on the outer sides of which are arranged the groups of keys for the other necessary consonants, and other keys may be provided in front of the vowel group. According to the invention, on the left hand outer side of the keys for the consonants L, R and N, a group of keys for three of the so-called explosives, preferably for the consonants P, T, C or K may be arranged, and, on their right hand outer side, a group of keys for three of the consonants C or K, F, G, P, S, or Z may be arranged, the key for the phonetic symbol S or Z being situated on the left hand outer side, and the key for the phonetic symbol T or D being situated on the left hand outer side, while in front of the group of vowels in the middle, a group of keys is provided on the left hand side for the letters V or F and J and on the right hand side a group of keys for the vowels I and U, and also an auxiliary key may be provided for a supplementary symbol for different phonetic symbols.

The machine may be so constructed in known manner that each symbol which is allocated to a key has a definite place on the paper, so that all the keys may be used simultaneously without the type levers jamming. Then always a complete syllable may be struck and printed if required with both hands simultaneously, whereby it is possible to attain a greater speed than with the usual typewriting machines.

The designing of the keyboard according to the invention has also been based on the following considerations:

If we consider the structure of the human hand, it is found that the little finger is the weakest, stiffest and at the same time the shortest finger. The thumb is also short but strong and moves inwardly more than the other fingers. Due to this fact, preferably the two outer keys S or Z and T or D are intended for the little finger and the two groups of keys with the letters V or F and J or I and U are intended for the two thumbs, while all the other keys are operated by the other three fingers.

The physiological analysis of the alphabet has also disclosed that there are substantially three articulation places in the Aryan languages, namely for the gutturals or pharyngeal consonants, the dentals or teeth consonants and labials or lip consonants K, or T, P. With the exception of rarely occurring, principally Greek words, it may be stated that these consonants never follow one another at the beginning of a syllable. Corresponding to the aforementioned consonantal structure of the Aryan languages, three individual keys are provided, according to the invention, on the keyboard for these three different sorts of explosives, the said keys being arranged in vertical sequence below one another. This arrangement provides the great advantage that firstly it adjoins perfectly the arrangement of the three keys for the liquid consonants L, R and N, and secondly that it gives perfect freedom for arranging at a higher level the rearmost, i. e. the remotest keys, in order to facilitate fingering. Another important advantage follows from this, namely, that a more highly situated key may if required be operated on the edge thereof, whereby the finger in question, after operating, may touch the key lying on a lower level, without, however, causing the latter key to make an impression. The described arrangement in rows of three keys below one another is a principal feature of this keyboard which is quite new for shorthand typewriting machines.

In order to have as small a number of keys as possible, two methods are used for the consonants, these methods being equal in principle because they are both based on the phenomenon, well known in phonetics, of the existence of related sounds, for example so-called sharp and soft consonants. In both methods, the soft consonants are derived from the sharp consonants. In the first method a supplementary or so-called determinative symbol is employed which, when it is printed together with certain keys, indicates the symbol for a letter other than that corresponding to the printed key. For this determinative symbol a special key is provided, which, according to the invention, is preferably located in the middle above the group of keys for the vowels. In addition, the key for the letter J serves at the same time for printing the determinative symbol, for which a curvature bent outwardly to the right may be selected. A combination of the explosives P, T and K, for which latter letter the internationally more usual C is chosen on the keyboard, with the determinative symbol gives according to the form the second set of explosives B or D, G. In the same way, the combination of the said symbol with the consonants S, V, N gives the initial consonants S(C) H, W and M, while the final consonants P, M, S(C) H, G and D are formed by the combination of the letters F or N, S, C and T with the determinative symbol. The letter H which is absent from the Romance languages and which often is not considered to be a consonant, is formed at the beginning of a syllable by the combination of the supplementary symbol J with the letter L, which for this purpose may be provided with a small cross stroke, so that for the eye the impression of an H is produced.

There are no separate keys for the letters Q and Y which is possible because, in the machine according to the invention, it is a matter of sounds. For the letter $q$, the $c$ is used, for $x$ which has the sound of $k$ $s$, the letters $c$ $s$ and for $y$ the letter $i$. The letters B and W have no special symbol because $B=P+j$ and $W=V+j$. For F at the beginning of a word, V is struck and for V at the end of a word, F is struck.

In the second method, the vowels $i$ and $u$ are transferred to the middle of the keyboard with the other vowels and the key for J is given a position in the middle below or in front of the vowel keys, so that, for the left and right hand thumbs, a key is available which is to be used as a shift key, whereby in known manner each type carrier may be provided with two types. As in the first method, the related sounds (and also the symbols related in form), are obtained by the simultaneous operation of the letter key and the shift key. Thus, the letters Z or B, D, G, M, W, and Y are formed from S, P, T, C, N, V and J.

A very important advantage of the keyboard according to the invention consists in the possibility of forming both so-called short and long vowels. Heretofore, there was no method whereby the distinction, in many respects necessary, could be made between short and long vowels. For a shorthand typewriting machine, this distinction becomes still more necessary, because a doubling of consonants for expressing shorter sounds cannot be utilized. For these reasons, the vowel group is provided, according to the invention, with two keys for the E, it being possible thereby to distinguish the short vowels from the long vowels in a clear and even appropriate manner.

A constructional example of a keyboard according to the invention is shown in the drawing.

Preferably, the front row of keys is arranged on the lowest level, while the following rows increase in height stepwise to the rear. Also, the keys V, J, I, U for the thumbs are so designed that two keys may easily be operated simultaneously by each thumb.

The position of the keys for the vowel symbols in the middle is based on the consideration that the index finger, being a comparatively short finger, in general allows of the operation of not more than two keys. Further, it is advisable to arrange the keys for the vowels stepwise as in the case of the consonants, so that with the vowels, as also with the consonants, mutually repellant sounds are arranged in a vertical row. The keys for the vowels A and O alone are intended for the left index finger, so that the other vowels E, U and I should actually give a combination of two vowels which do not occur in succession. This does not appear to be possible. As there are short and long vowels, it is desirable to have two symbols E representing the short and long E, which are therefore never operated simultaneously and are also used for supplementing other vowel symbols which occur, for example IE, AE, UE. To print AA the keys A and E may be depressed, and for OO the keys O and e. The sound OE, as in the Dutch word "boek" may be represented by the combination of O and E. The other vowels I and U are allotted to the right hand thumb.

It would seem natural to select the position for the seven keys for the consonants on the right hand of the group of vowel keys in the form of the mirror image of the position of the seven keys on the left hand of the keyboard. This is not desirable however. It is better in fact to exchange the position of the keys for the so-called dentals S and T on the right hand side, so that T on the right hand side is operated by the little finger, and thus, for example, the combinations LT, FT, RT, RST, ST, NT, NCT, CT may rapidly be formed. The difference between the letters P and B, F and V at the end of a syllable and between the letters S and Z at the beginning and end of a syllable may be disregarded.

What I claim is:—

1. A shorthand typewriting machine or stenographic machine wherein the keys of the keyboard for the phonetic symbols are divided into groups, the keys for the initial consonants being situated on the left hand side, those for the final consonants on the right hand side and those for the vowels in the middle, characterized in that the subdivision is so carried out that the keys for the vowels, which are situated in the middle, are adjoined on the right and left hand by a group of three keys arranged one below another for three of the so-called liquid consonants, namely preferably for the consonants L, R, N, on the outer sides of which are arranged the groups of keys for the other necessary consonants, and other keys are provided in front of the vowels.

2. A shorthand typewriting machine or stenographic machine wherein the keys of the keyboard for the phonetic symbols are divided into groups, the keys for the initial consonants being situated on the left hand side, those for the final consonants being situated on the right hand side, and those for the vowels in the middle, characterized in that the subdivision is so carried out that the keys for the vowels are joined on the right and left hand by a group of three keys arranged one below another for three of the so-called liquid consonants, namely, the consonants L, R, N, there being other keys provided in front of the vowels, in that on the left hand outer side of the keys for the consonants L, R, N, is arranged a group of keys for three of the so-called explosives, such as the consonants P, T, C or K and on the other right hand outer side is arranged a group of keys for three of the consonants C or K, F, G, P, S, or Z, the keys for the phonetic symbols S or Z being situated on the left hand outer side and the key for the phonetic symbols T or D being situated on the right hand outer side, while there is also in front of the vowel group in the middle on the left hand a group of keys for the letters V or F and J, and on the right hand a group of keys for vowels I and U, and in addition an auxiliary key for the supplemental symbol for different phonetic symbols is provided.

3. A machine as claimed is claim 2, wherein the auxiliary key for the supplemental symbol is situated in the middle above the key group for the vowels.

4. A machine as claimed in claim 2 wherein the key groups for the letters V or F, J and I, and U are of such a shape that they may be operated independently or simultaneously by the thumb of the hand.

5. A machine as claimed is claim 1, wherein two of the keys in front of the vowel groups are utilized as shift keys for the left and right hand respectively.

6. A machine as claimed in claim 1, wherein the vowel group includes a pair of keys for E in order that long and short vowels can be distinguished.

In testimony whereof I affix my signature.

MARIUS DEN OUTER.